Figure 1:
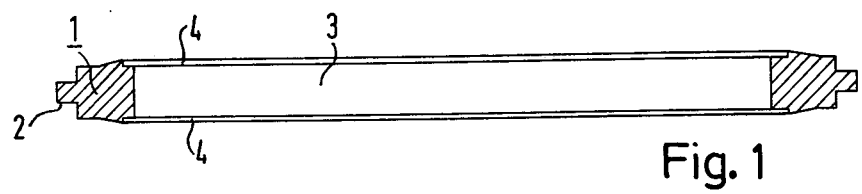

United States Patent [19]

Rösch et al.

[11] 4,120,081
[45] Oct. 17, 1978

[54] MANUFACTURE OF PISTONS INCORPORATING A THERMAL BARRIER

[75] Inventors: Fritz Rösch, Schwabach; Rudolf Zimmermann, Nuremberg, both of Germany

[73] Assignee: Alcan Aluminiumwerk Nürnberg GmbH, Germany

[21] Appl. No.: 800,880

[22] Filed: May 26, 1977

[30] Foreign Application Priority Data

May 31, 1976 [DE] Fed. Rep. of Germany ........ 2624412

[51] Int. Cl.² .............................................. B23P 15/10
[52] U.S. Cl. ............................ 29/156.5 R; 29/527.5; 123/41.16; 123/41.35; 123/193 CP; 92/176; 164/75; 164/DIG. 8
[58] Field of Search ............ 29/156.5 R, 527.1, 527.5; 123/41.16, 41.34, 41.35, 193 CP, 193 P; 92/186, 176; 164/75, 98, 108, DIG. 8

[56] References Cited

U.S. PATENT DOCUMENTS

| 1,390,193 | 9/1921 | Bowmar | 164/DIG. 8 |
| 2,865,348 | 12/1958 | Krämer | 123/41.35 |
| 2,893,083 | 7/1959 | Ladd | 164/75 |
| 3,616,729 | 11/1971 | Fischer | 123/41.35 |
| 3,628,511 | 12/1971 | Fischer | 123/41.16 |

FOREIGN PATENT DOCUMENTS

| 2,000,249 | 9/1971 | Fed. Rep. of Germany | 123/193 P |
| 2,410,140 | 9/1975 | Fed. Rep. of Germany | 123/193 P |
| 860,716 | 1/1941 | France | 123/193 P |
| 1,162,420 | 9/1958 | France | 92/186 |

Primary Examiner—Milton S. Mehr
Assistant Examiner—Daniel C. Crane
Attorney, Agent, or Firm—Cooper, Dunham, Clark, Griffin & Moran

[57] ABSTRACT

A piston incorporating a thermal barrier is produced by first making an annular piston ring carrier insert from steel. The insert comprises an annular body to the upper and lower radially-inner edges of which are secured the upper and lower edges of an annular element which is channel shaped in radial cross-section and the channel in which faces radially outward. The element is soldered or welded to the insert body so that an enclosed annular space is defined between the element and body. The insert thus formed is then heated in molten aluminium to "alfinize" its external surface. The treated insert is subsequently placed in a piston mold and the piston is molded about it from aluminium.

7 Claims, 5 Drawing Figures

MANUFACTURE OF PISTONS INCORPORATING A THERMAL BARRIER

The invention relates to the manufacture of pistons, more particularly for internal combustion engines, incorporating a heat-transfer barrier to reduce the temperature of the piston ring grooves, and therefore of the piston rings, or other zones of the piston.

Such a heat-transfer barrier usually comprises one or more cavities, and the production of pistons containing cavities suitable as heat-transfer barriers is very complicated. The general procedure is to machine the cavities in the piston blank and then to close them by fitting parts which are secured by means of screws or by welding. In another known method, the cavities, formed in the partly machined pistons, are closed by forging or shrinking operations. Hitherto it has not been possible to form cavities, acting as heat-transfer barriers, directly during a casting operation, since appropriately shaped cores have been necessary for the purpose, and it has not been practicable to remove the material of the cores afterwards.

According to the invention, there is provided a method of producing a piston comprising forming a piston ring carrier insert by securing opposite circumferentially extending edges of an annular ferrous metal member to axially opposite radially-inner edge portions respectively of an annular ferrous metal piston ring carrier body whereby an enclosed annular space is formed between the body and treating the assembled insert to form an iron/aluminium alloy at the external surface of the insert, placing the treated assembled insert in a piston mould and casting aluminium in the mould to form the piston.

The annular member may conveniently be made from sheet steel.

Advantageously, the surfaces on the ring carrier body that support the two edges of the annular member, bent to a substantially U-shaped cross-section, are machined to form annular rebates for accommodating the two edges of the annular member, which edges are placed in these rebates and, while in this position, are welded or soldered to the ring carrier body.

In a preferred method of the invention the annular member is first secured by its outer edge whilst still flat to the ring carrier body, the annular member thereafter shaped to its finished U-section, and its other edge is then secured to the ring carrier body.

Figure 2:
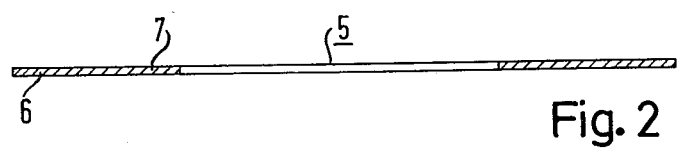
Figure 3:
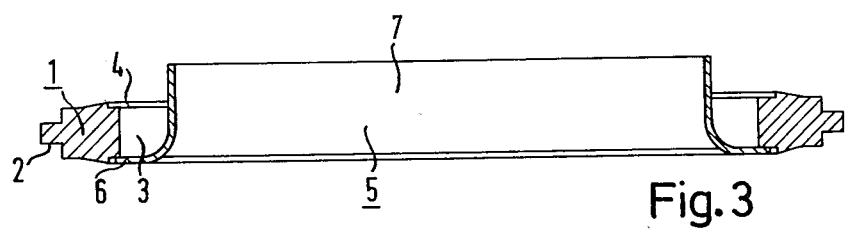
Figure 4:
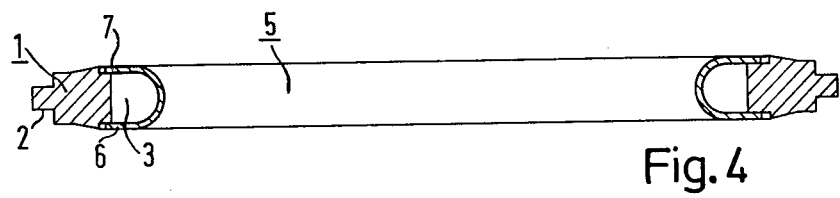
Figure 5:
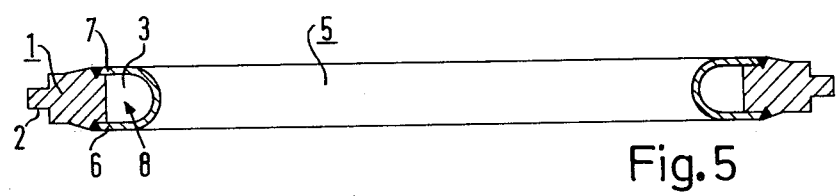

The attached drawings show various stages in carrying out a method of production in accordance with the invention. In the drawings:

FIG. 1 shows in cross-section a ring carrier body prepared prior to carrying out the method, FIG. 2 shows in cross-section a sheet-steel ring used in forming the annular duct, FIG. 3 illustrates, in cross-section the ring carrier body and the sheet-steel ring with its outer edge positioned on the body while the ring is being shaped, FIG. 4 shows a cross-section through the ring carrier body with the fully shaped sheet-steel ring positioned on it, and FIG. 5 shows the completed ring carrier insert, with the sheet-steel ring secured by welding.

The steps used in the method are as follows. The ring carrier body 1, which is made from steel and has an outer locating flange 2, is provided on its upper and lower radially-inner edges with shallow rebates 4 which are formed by turning on a lathe, and the depth of which corresponds approximately to the thickness of the sheet-steel ring 5 illustrated in FIG. 2. The outer edge 6 of the sheet-steel ring 5 is laid in the shallow recess 4 formed in the lower surface of the ring carrier 1, and thereafter the ring 5 is shaped to bring its other free edge 7 through the intermediate position illustrated in FIG. 3 into engagement with the rebate 4 at the upper side of the ring carrier body as shown in FIG. 4. Thereafter the two edges 6 and 7 of the sheet-steel ring 5 are tightly welded to the ring carrier body as shown in FIG. 5, so that the radially-inner surface 3 of the ring carrier and the shaped ring 5 together define an enclosed annular space.

The completed ring carrier insert shown in FIG. 5 is then "aluminized" or "alfinized", that is to say, it is heated in a bath of molten aluminium to cause an iron-aluminium alloy to be formed at the external surfaces of the insert, which alloy is covered with a layer of aluminium. The "aluminized" insert is then located in a piston mould, and the aluminium piston is cast, whereafter the piston is machined in the usual way, and the annular piston ring grooves are cut in the ring carrier.

Thus the described method enables a fully annular cavity to be formed in the head of the piston, adjoining the ring carrier so as to increase its efficiency as a heat-transfer barrier.

We claim:

1. A method of producing a piston comprising
   (a) forming a piston ring carrier insert by
      (i) forming an annular steel member, having two opposite circumferentially extending edges, to be channel-shaped in radial cross-section, the channel facing radially outward, and
      (ii) securing said opposite circumferentially extending edges of said annular member to axially opposite radially-inner inner edge portions respectively of an annular ferrous metal piston ring carrier body whereby an enclosed annular space is formed between the body and the annular member,
   (b) treating the assembled insert to form an iron-/aluminium alloy at the external surface of the insert,
   (c) placing the treated assembled insert in a piston mould and
   (d) casting aluminium in the mould to form the piston.

2. A method as claimed in claim 1, wherein the annular member is made from sheet steel.

3. A method as claimed in claim 2 wherein the annular member is initially flat and is subsequently formed to be channel-shaped in radial cross-section as aforesaid.

4. A method as claimed in claim 3, wherein said edge portions of the ring carrier body are formed with rebates to receive said edges of the annular member.

5. A method as claimed in claim 3 wherein the annular member is, whilst still flat, first secured at its outer edge to the ring carrier body, whereafter the annular member is shaped to its finished channel-section, and then has its other edge secured to the ring carrier body.

6. A method as claimed in claim 1 wherein the annular member is secured to the ring carrier body by welding.

7. A method as claimed in claim 1 wherein the annular member is formed from a tubular shape to be channel-shaped in cross-section as aforesaid.